US011002962B2

(12) United States Patent
Yokoe et al.

(10) Patent No.: US 11,002,962 B2
(45) Date of Patent: May 11, 2021

(54) HEAD-UP DISPLAY DEVICE

(71) Applicant: DENSO CORPORATION, Kariya (JP)

(72) Inventors: Junya Yokoe, Kariya (JP); Takahiro Nambara, Kariya (JP)

(73) Assignee: DENSO CORPORATION, Aichi-pref. (JP)

( * ) Notice: Subject to any disclaimer, the term of this patent is extended or adjusted under 35 U.S.C. 154(b) by 288 days.

(21) Appl. No.: 16/264,720

(22) Filed: Feb. 1, 2019

(65) Prior Publication Data
US 2019/0162961 A1 May 30, 2019

Related U.S. Application Data

(63) Continuation of application No. PCT/JP2017/022092, filed on Jun. 15, 2017.

(30) Foreign Application Priority Data

Aug. 5, 2016 (JP) .............................. JP2016-154692

(51) Int. Cl.
*G02B 27/01* (2006.01)
*B60K 35/00* (2006.01)
*G02B 5/28* (2006.01)
*G01C 21/36* (2006.01)

(52) U.S. Cl.
CPC .......... *G02B 27/0101* (2013.01); *B60K 35/00* (2013.01); *G02B 5/28* (2013.01); *G02B 5/282* (2013.01); *G02B 27/01* (2013.01); *B60K 2370/334* (2019.05); *B60K 2370/70* (2019.05); *G01C 21/365* (2013.01); *G02B 2027/0112* (2013.01)

(58) Field of Classification Search
CPC ...... G02B 27/0101; G02B 27/01; G02B 5/28; G02B 5/282; G02B 2027/0112; B60K 35/00; B60K 2370/1529; B60K 2370/25
See application file for complete search history.

(56) References Cited

FOREIGN PATENT DOCUMENTS

JP 2003344801 A 12/2003
JP 2007065011 A 3/2007

OTHER PUBLICATIONS

U.S. Appl. No. 16/307,077, filed Dec. 4, 2018, Yokoe et al.

*Primary Examiner* — Cara E Rakowski
(74) *Attorney, Agent, or Firm* — Harness, Dickey & Pierce, P.L.C.

(57) ABSTRACT

A light guide unit guides a display light toward a projection member. A multilayer film filter unit transmits the display light with an optical multilayer film and shields an external light incident from a projection window. In the XYZ color system, a first wavelength region is between a wavelength having a maximum value of a color matching function Z and a wavelength having a maximum value of a color matching function Y. A second wavelength region is between the wavelength having the maximum value of the color matching function Y and a wavelength having a maximum value of a color matching function X. A minimum transmittance of the multilayer film filter unit to the display light takes a minimum value among transmittances of respective wavelengths in a target wavelength region. The minimum transmittance in the first wavelength region is smaller than that in the second wavelength region.

14 Claims, 10 Drawing Sheets

HEAD-UP DISPLAY DEVICE

CROSS REFERENCE TO RELATED APPLICATIONS

The present application is a continuation application of International Patent Application No. PCT/JP2017/022092 filed on Jun. 15, 2017, which designated the United States and claims the benefit of priority from Japanese Patent Application No. 2016-154692 filed on Aug. 5, 2016. The entire disclosures of all of the above applications are incorporated herein by reference.

TECHNICAL FIELD

The present disclosure relates to a head-up display device (hereinafter abbreviated as HUD device).

BACKGROUND

Conventionally, a known HUD device is mounted on a movable object and displays a virtual image viewable by an occupant by projecting a display light onto a projection member through a projection window.

SUMMARY

According to an aspect of the present disclosure, a head-up display device is configured to be mounted on a movable object and to project a display light through a projection window onto a projection member to display a virtual image visibly recognizable by an occupant. The head-up display device comprises a display light projection unit configured to project an image as the display light including a plurality of wavelengths in a visible region. The head-up display device further comprises a light guide unit configured to guide the display light from the display light projection unit toward the projection member. The light guide unit includes a multilayer film filter unit configured to transmit the display light and to shield an external light incident from the projection window by using an optical multilayer film.

BRIEF DESCRIPTION OF THE DRAWINGS

The present disclosure will become more apparent from the following detailed description made with reference to the accompanying drawings. In the drawings.

DESCRIPTION OF EMBODIMENTS

Figure 1:
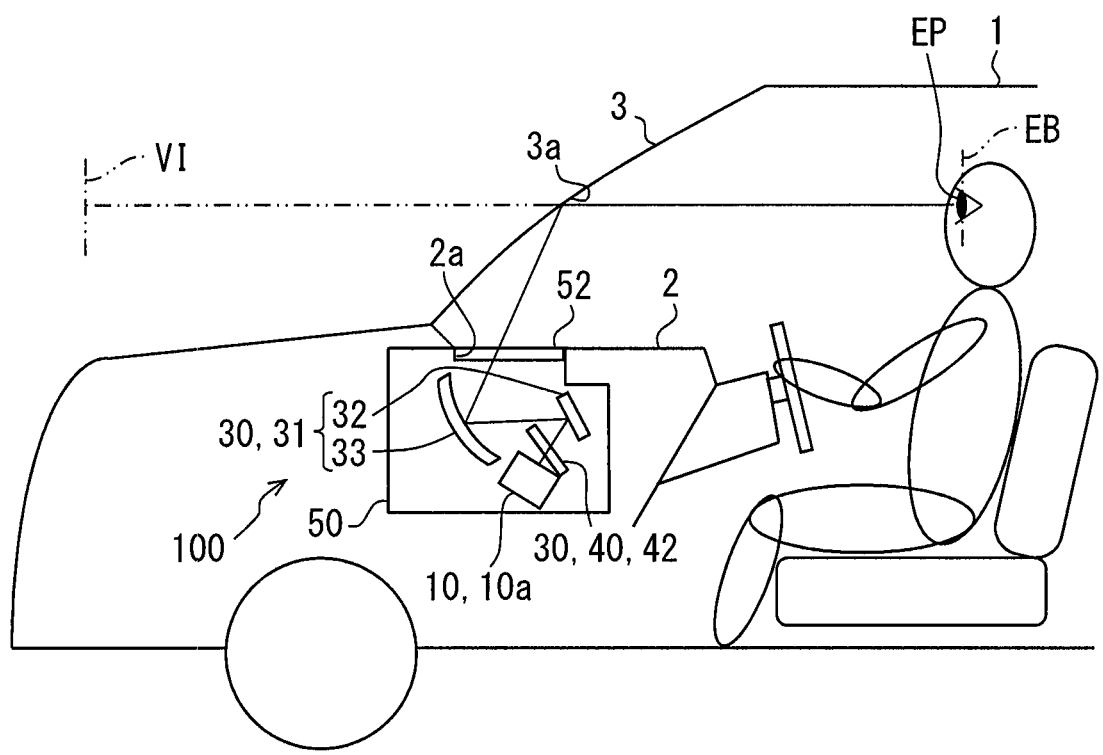
FIG. 1 is a diagram showing a state in which an HUD device is mounted on a vehicle according to an embodiment.

First, technical issues found by the Inventor will be described.

For example, a HUD device includes a display light projection unit and a light guide unit. The display light projection unit projects an image as a display light. The light guide unit guides the display light from the display light projection unit toward the projection member. In this example, the light guide unit has a hot mirror which transmits the display light and which also enables to shield the external light such as the sunlight incident from the projection window.

In such a hot mirror, a high transmittance would be achieved in an entire visible region. In such a transmittance characteristic, in terms of transmission of the display light, there is a possibility that a specific wavelength region in a visible region would be attenuated. Inventor has concerned that a display quality of a virtual image would be degraded. Conversely, however, the external light may pass through the hot mirror in the entire visible region. Therefore, the light shielding performance of the external light by the hot mirror may not be sufficient. Inventor has further concerned that the light transmitted through the hot mirror would reach the display light projection unit and would be converted into a heat. Consequently, the display light projection unit would be damaged by an influence of the heat, to thereby reduce a lifetime of the HUD device.

Therefore, the present inventors have conducted a detailed study on an HUD device in which a resistance from an external light is further enhanced while maintaining the display quality of a virtual image. Consequently, the present inventors have conceived to provide, in the light guide unit, a multilayer film filter unit, which is a filter unit capable of transmitting the display light and shielding the external light and whose transmittance is set in consideration of color matching functions X, Y, and Z in an XYZ color system with the use of an optical multilayer film.

Specifically, a first wavelength region which is a wavelength region between a wavelength having a maximum value of the color matching function Z and a wavelength having a maximum value of the color matching function Y is compared with a second wavelength region which is a wavelength region between a wavelength having the maximum value of the color matching function Y and a wavelength having a maximum value of the color matching function X. As a result of the comparison, the inventor has found that both of the degree of influence on the luminance of the virtual image in the first wavelength region and the degree of influence on the chromaticity of the virtual image tend to be relatively smaller than those in the second wavelength region. The inventors have further found that the above trend can be used to achieve the above-mentioned performance.

The following description may relate to an HUD device configured to further enhance a resistance to an external light while maintaining a display quality of a virtual image.

Hereinafter, embodiments of the present disclosure will be described with reference to the drawings.

As shown in FIG. 1, a HUD device 100 according to an embodiment of the present disclosure is mounted on a vehicle 1, which is a type of movable object and is accommodated in an instrument panel 2. The HUD device 100 projects a display light through a projection window 2a provided on an upper surface of the instrument panel 2 onto a windshield 3 as a projection member of the vehicle 1. The display light is reflected on the windshield 3, and the HUD device 100 displays a virtual image of the image that is viewable by an occupant of the vehicle 1. In other words, the display light reflected on the windshield 3 reaches a visual recognition region EB set in an interior of the vehicle 1, as a result of which an occupant whose eye point EP is positioned within the visual recognition region EB perceives the display light as a virtual image VI. The occupant is capable of recognizing various types of information by the virtual image VI. Examples of various types of information which is displayed as the virtual image of the image include state values of the vehicle 1 such as a vehicle speed and a remaining fuel level, or navigation information such as road information and visibility auxiliary information.

The windshield 3 of the vehicle 1 is formed in a plate-shape and made of a light transmissive glass or a synthetic resin. In the windshield 3, a projection surface 3a onto which the display light is projected is formed into a smooth concave surface shape or a flat surface shape. As the projection member, instead of the windshield 3, a combiner that is separate from the vehicle 1 may be installed inside the vehicle 1, and the image may be projected onto the combiner. The HUD device 100 per se may include a combiner as the projection member.

The visual recognition region EB is a region in which the virtual image VI displayed by the HUD device 100 is clearly visible. Usually, the visual recognition region EB is provided so as to overlap with an eyelips set in the vehicle 1. The eyelips is set based on an eye range that statistically represents the distribution of eye points of a driver as an occupant (in detail, refer to JISD0021: 1998).

A specific configuration of the HUD device 100 described above will be described below with reference to FIG. 2. The HUD device 100 includes a display light projection unit 10 and a light guide unit 30. The display light projection unit 10 and the light guide unit 30 are housed in a housing 50 of the HUD device 100.

Figure 2:
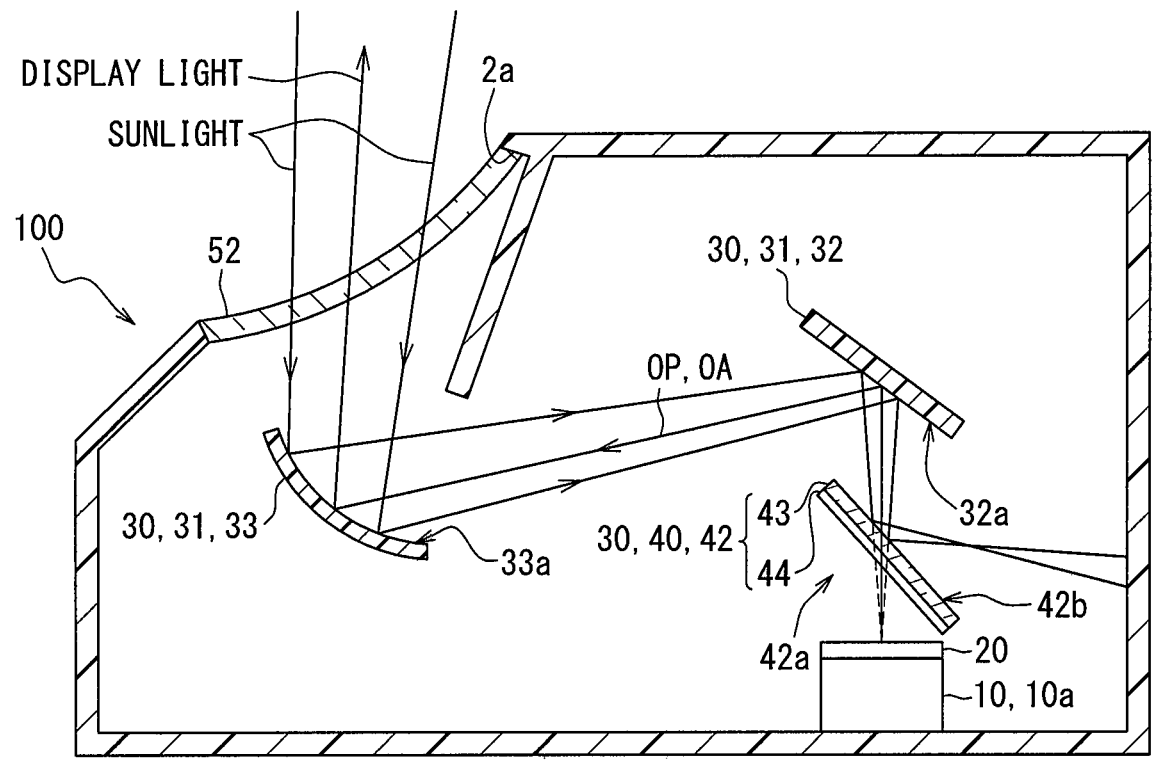
FIG. 2 is a diagram showing a schematic configuration of the HUD device according to the embodiment.
Figure 3:
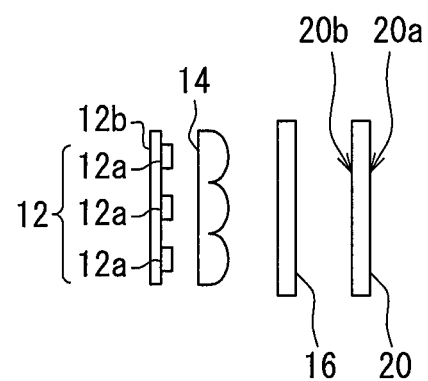
FIG. 3 is a diagram showing a display light projection unit according to the embodiment.

As shown in FIGS. 2 and 3, the display light projection unit 10 includes a light source 12, a condenser lens 14, a field lens 16, and a liquid crystal panel 20, and is formed by accommodating those components in a box-shaped casing 10a, for example.

The light source 12 is configured, for example, by an array of multiple light emitting devices 12a. The light emitting device 12a in the present embodiment is a light emitting diode device that is located on a light source circuit board 12b and connected to a power source. Each light emitting device 12a emits a light with a light emission amount corresponding to a current amount by energization. More specifically, in each of the light emitting devices 12a, for example, a blue light emitting diode is covered with a phosphor, to thereby realize a light emission with pseudo white. In the present embodiment, the three light emitting devices 12a are provided.

The condenser lens 14 and the field lens 16 are located between the light source 12 and the liquid crystal panel 20. The condenser lens 14 is made of, for example, synthetic resin or glass and has a light transmissive property. In particular, the condenser lens 14 according to the present embodiment is a lens array in which multiple convex lens elements 14a are arrayed according to the number and placement of the light emitting devices 12a. The condenser lens 14 condenses the light incident from the light source 12 and emits the condensed light toward the field lens 16.

The field lens 16 is located between the condenser lens 14 and the liquid crystal panel 20, and is made of, for example, a synthetic resin, glass or the like to have a light transmissive property. In particular, the field lens 16 according to the present embodiment is a Fresnel lens formed in a plate-like shape. The field lens 16 further condenses the light incident from the condenser lens 14 and emits the condensed light toward the liquid crystal panel 20.

The liquid crystal panel 20 according to the present embodiment is configured with a liquid crystal panel formed of a thin film transistor (TFT) and includes, for example, an active matrix liquid crystal panel formed of multiple liquid crystal pixels 21 that are arrayed in two directions.

Figure 4:
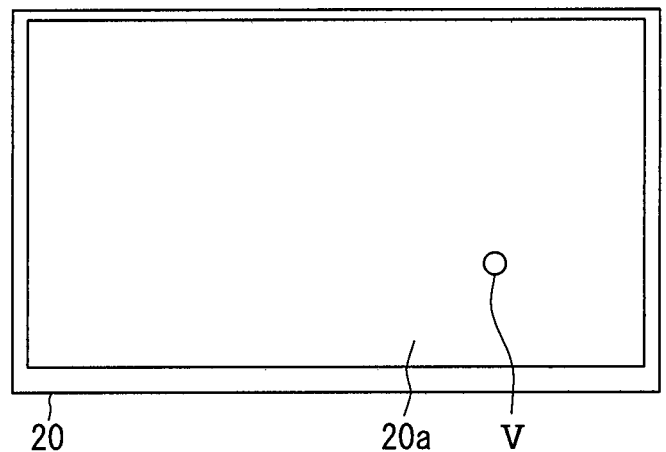
FIG. 4 is a diagram of the display light projection unit as viewed from the light guide unit side according to the embodiment.
Figure 5:
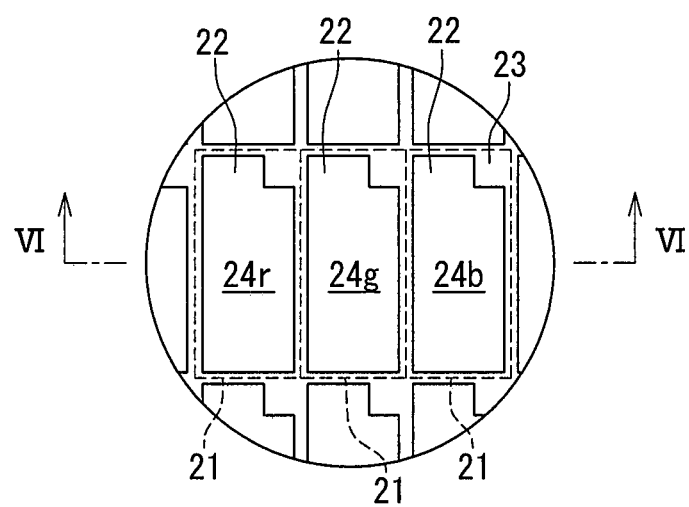
FIG. 5 is an enlarged view of a portion V of FIG. 4.

Specifically, as shown in FIG. 4, the liquid crystal panel 20 has a rectangular shape having a longitudinal direction and a short direction. As shown in FIG. 5, since the liquid crystal pixels 21 are arrayed in a longitudinal direction and a short direction, a display surface 20a that emits an image as a display light on the light guide unit 30 side also has a rectangular shape. In each liquid crystal pixel 21, a transmissive portion 22 penetrating through the display surface 20a in a normal direction and a wiring portion 23 formed so as to surround the transmissive portion 22 are provided.

Figure 6:
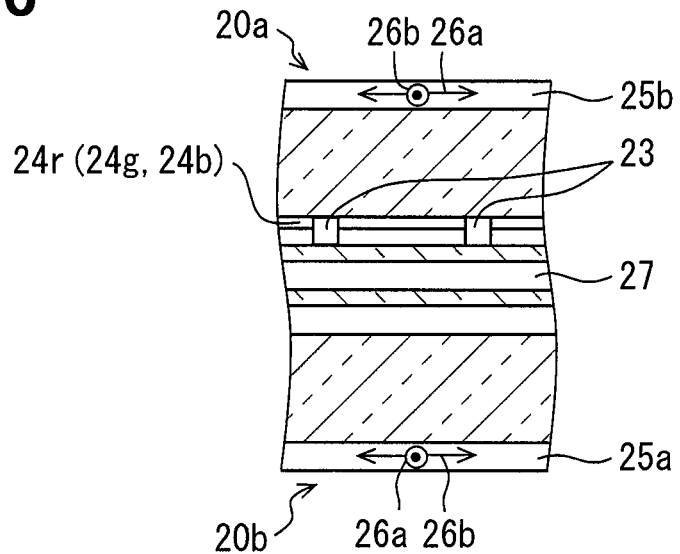
FIG. 6 is a cross-sectional view taken along line VI-VI of FIG. 5.

As shown in FIG. 6, the liquid crystal panel 20 is formed by stacking a pair of polarizing plates 25a and 25b and a liquid crystal layer 27 sandwiched between the pair of polarizing plates 25a and the like, and thus has a plate-like shape. Each of the polarizing plates 25a and 25b has a transmission axis 26a and an absorption axis 26b orthogonal to the transmission axis 26a. Each of the polarizing plates 25a and 25b has a property of transmitting a light polarized in a direction of the transmission axis 26a and absorbing a light polarized in a direction of the absorption axis 26b, and the pair of polarizing plates 25a and 25b are located to be orthogonal to the direction of the transmission axis 26a. The liquid crystal layer 27 can rotate the polarization direction of the light transmitted through the liquid crystal layer 27 according to an applied voltage by applying the voltage to each of the liquid crystal pixels 21. A ratio of the light transmitted through the polarizing plate 25b on the light guide unit 30 side due to the rotation of the polarization direction, that is, a transmittance is modifiable at any time.

Therefore, the liquid crystal panel 20 controls the transmittance of each liquid crystal pixel 21 with respect to the incidence of the light from the field lens 16 on an illumination target surface 20b which is a surface on the light source 12 side. In other words, the liquid crystal panel 20 forms an image in accordance with the illumination from the light source 12 so that the image can be emitted as the display light. In the present embodiment, the display light is projected as a linearly polarized light polarized in the polarization direction along a longitudinal direction of the liquid crystal panel 20 because the transmission axis 26a of the polarizing plate 25b on the light guide unit 30 side is along a longitudinal direction.

As shown in FIG. 5, color filters 24r, 24g, and 24b of mutually different colors (for example, red, green, and blue) are provided in adjacent liquid crystal pixels 21, and various colors are achieved by the combinations of those color filters.

Figure 7:
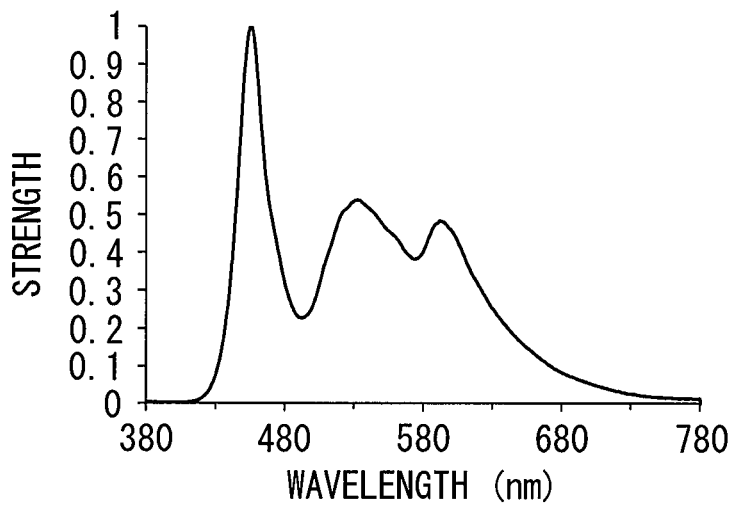
FIG. 7 is a graph showing a spectrum of a display light immediately after being projected from the display light projection unit according to the embodiment.

With the liquid crystal panel 20, the display light projection unit 10 can project an image as the display light with spectrum corresponding to the emission spectrum of the light source 12 and the transmittance characteristics of the color filters 24r, 24g, and 24b. FIG. 7 shows the spectrum of the display light projected by the display light projection unit 10 when the transmittance of all the liquid crystal pixels 21 is maximized in terms of performance in the present embodiment. The spectrum of the display light including multiple wavelengths in a visible region (for example, 380 to 780 nm) has a local maximum value at about 450 nm, about 350 nm, and about 600 nm, and a local minimum value at about 500 nm and about 580 nm, corresponding to the characteristics of each of the color filters 24r, 24g, and 24b.

With the display light projection unit 10 described above, the display light projected from the display surface 20a of the liquid crystal panel 20 is incident on the light guide unit 30.

As shown in FIG. 2, the light guide unit 30 is an optical system that guides the display light from the display light projection unit 10 toward the windshield 3, and configures a part of an optical path OP until the display light reaches the visual recognition region EB. The light guide unit 30 includes a multilayer film filter unit 40 and a light guide mirror unit 31.

The multilayer film filter unit 40 according to the present embodiment is located on the optical path OP of the display light on the display light projection unit 10 side of respective mirrors 32 and 33 of the light guide unit 30. The multilayer film filter unit 40 transmits the display light with the use of an optical multilayer film 44. The display light transmitted through the multilayer film filter unit 40 is made incident on the light guide mirror unit 31.

The light guide mirror unit 31 has the planar mirror 32 and the concave mirror 33. The planar mirror 32 is located closer to the display light projection unit 10 than the concave mirror 33 on the optical path OP of the display light. The planar mirror 32 is formed, for example, by evaporating aluminum as a reflection surface 32a on a surface of a base material made of synthetic resin, glass or the like. The reflection surface 32a is formed in a smooth planar shape. The display light incident on the planar mirror 32 from the display light projection unit 10 in the optical path OP is reflected on the reflection surface 32a toward the concave mirror 33 on the windshield 3 side.

The concave mirror 33 is located closer to the windshield 3 than the planar mirror 32 on the optical path OP. The concave mirror 33 is formed, for example, by evaporating aluminum as a reflection surface 33a on the surface of a base material made of synthetic resin, glass or the like. The reflection surface 33a is formed into a smooth concave shape by curving into a concave shape in which a center of the concave mirror 33 is concave. In the optical path OP, the display light incident on the concave mirror 33 from the planar mirror 32 on the display light projection unit 10 side is reflected on the reflection surface 33a toward the windshield 3 through the projection window 2a. In detail, the concave mirror 33 has a function to enlarge a size of the virtual image VI visually recognized by an occupant with respect to a size of the image of the display surface 20a in the display light projection unit 10 by the concave reflection surface 33a.

Further, the concave mirror 33 is rotatable around a connecting shaft connected to a stepping motor, and a position of the virtual image VI is movable up and down with a change in a direction of the reflection surface 33a by the rotation.

In the present embodiment, an optical axis OA which can be configured with the light guide unit 30 is a path of a light ray passing through the center of the display surface 20a of the display light projection unit 10 and the center of the reflection surfaces 32a and 33a of the mirrors 32 and 33.

A light transmissive dustproof cover 52 is located in a portion of the housing 50 corresponding to the projection window 2a as a component of the light guide unit 30. Therefore, the display light from the concave mirror 33 passes through the dustproof cover 52 and is projected onto the windshield 3. Thus, the display light reflected on the windshield 3 reaches the visual recognition region EB, thereby enabling the occupant to visually recognize the virtual image VI.

Figure 8:
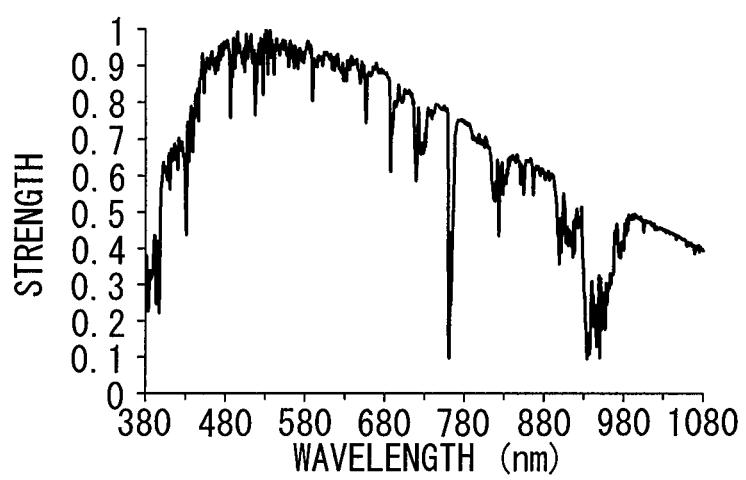
FIG. 8 is a graph showing a spectrum of sunlight.

In the vehicle 1 equipped with such an HUD device 100, after the external light such as sunlight, for example, has been transmitted through the windshield 3, the external light can be made incident on an inside of the HUD device 100 through the projection window 2a. Part of the light incident on the inside of the HUD device 100 from the projection window 2a is reflected on the concave mirror 33 in the light guide unit 30 so as to go against a progress of the display light on the optical path OP, and is then further reflected on the planar mirror 32, and is incident on the multilayer film filter unit 40. FIG. 8 shows a spectrum of sunlight as the external light that can be incident on the multilayer film filter unit 40. The spectrum of sunlight has a small wavelength dependence with respect to the spectrum of the display light in FIG. 7, and is broadly and smoothly distributed in a visible region (for example, 380 to 780 nm) and an infrared region (for example, 780 to 1080 nm).

If the multilayer film filter unit 40 has such a characteristic that a large amount of the sunlight described above is transmitted toward the display light projection unit 10, the amount of light of the sunlight reaching the display light projection unit 10 increases. The sunlight reaching the display light projection unit 10 is converted into a heat, for example, to cause a damage to the display light projection unit 10, to thereby shorten a lifetime of the display light projection unit 10. In other words, it is desirable that the multilayer film filter unit 40 has a characteristic in which the transmittance of sunlight therethrough is small.

On the other hand, since the multilayer film filter unit 40 also has a function of transmitting the display light, it would be desired to display the virtual image VI by the display light in a state where the display quality is high.

In this example, the degree of influence of each wavelength on the luminance and chromaticity in the display light having the spectrum of FIG. 7 will be described. As the XYZ color system in the following description, a CIE 1931 color system is applied. However, if there are special circumstances in which the application of the CIE 1931 color system becomes obviously inappropriate, such as when a distance from the eye point EP to the virtual image VI becomes very short, the CIE 1964 color system may be applied instead of the CIE 1931 color system. The detail of the respective color systems can be referred to ISO11664-1:2007.

Figure 9:
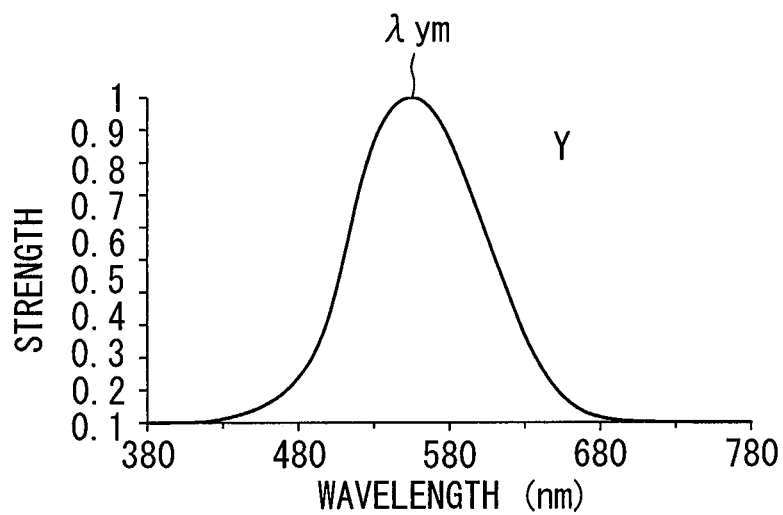
FIG. 9 is a graph showing a color matching function Y in an XYZ color system.
Figure 10:
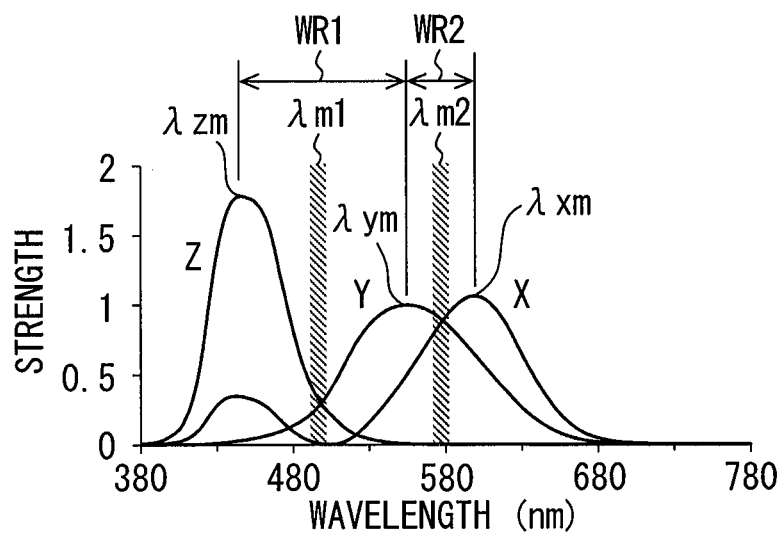
FIG. 10 is a graph showing a color matching function X, a color matching function Y, and a color matching function Z in the XYZ color system.

Further, for the following description, in the above-mentioned XYZ color system, as shown in FIGS. 9 and 10, a wavelength region between a wavelength $\lambda zm$ having a maximum value of the color matching function Z and a wavelength $\lambda ym$ having a maximum value of the color matching function Y is defined as a first wavelength region WR1, and a wavelength region between the wavelength $\lambda ym$ having the maximum value of the color matching function Y and a wavelength $\lambda xm$ having a maximum value of the color matching function X is defined as a second wavelength region WR2. In the CIE 1931 color system, the wavelength $\lambda xm$ is 599 nm, the wavelength $\lambda ym$ is 555 m, and the wavelength $\lambda zm$ is 446 nm. Therefore, substantially, the first wavelength region WR1 corresponds to a range of from 446 to 555 nm, and the second wavelength region WR2 corresponds to a range of from 555 to 599 nm.

Furthermore, a wavelength that is exactly intermediate between the wavelength $\lambda zm$ with the maximum value of the color matching function Z and the wavelength $\lambda ym$ with the maximum value of the color matching function Y is defined as a first intermediate wavelength $\lambda m1$, and a wavelength that is exactly intermediate between the wavelength $\lambda ym$ with the maximum value of the color matching function Y and the wavelength $\lambda xm$ with the maximum value of the color matching function X is defined as a second intermediate wavelength $\lambda m2$. In the CIE 1931 color system, the first intermediate wavelength $\lambda m1$ is about 500 nm and the second intermediate wavelength $\lambda m2$ is about 580 nm.

Figure 11:
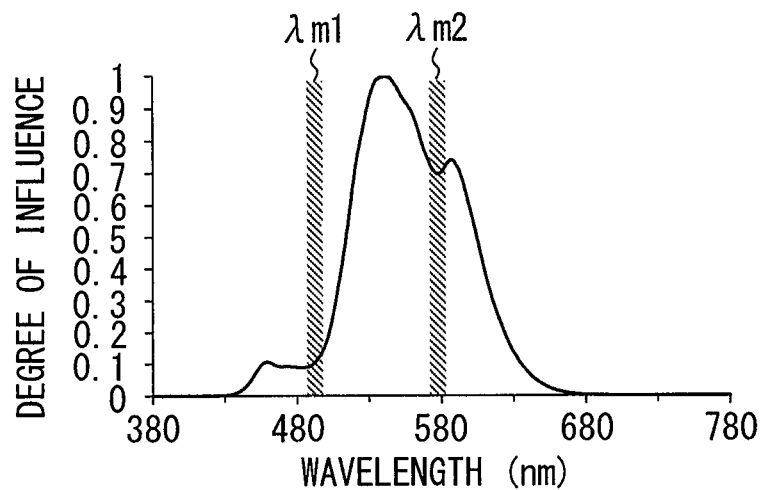
FIG. 11 is a graph showing a wavelength dependence of the degree of influence on a luminance of the display light according to the embodiment.

The degree of influence on the luminance of each wavelength in the display light of the present embodiment can be expressed as shown in FIG. 11 by multiplying the color matching function Y of FIG. 9 by the spectrum of the display light of FIG. 7. In this example, since the display light includes wavelengths in the first wavelength region WR1 and the second wavelength region WR2, the degree of influence in each of the regions WR1 and WR2 is not 0 in FIG. 11. Specifically, referring to FIG. 11, the first wavelength region WR1 side from about 550 nm, which has the highest degree of influence, gradually decreases the degree of influence, while the second wavelength region WR2 side maintains the degree of influence of 0.5 or more over the entire region. Therefore, the first wavelength region WR1 is smaller in the degree of influence on the luminance than the second wavelength region WR2. The degree of influence of the first intermediate wavelength $\lambda m1$ is about 0.1, and the degree of influence of the second intermediate wavelength $\lambda m2$ is about 0.7. Therefore, the first intermediate wavelength $\lambda m1$ is smaller in the degree of influence on the luminance than the second intermediate wavelength $\lambda m2$.

Figure 12:
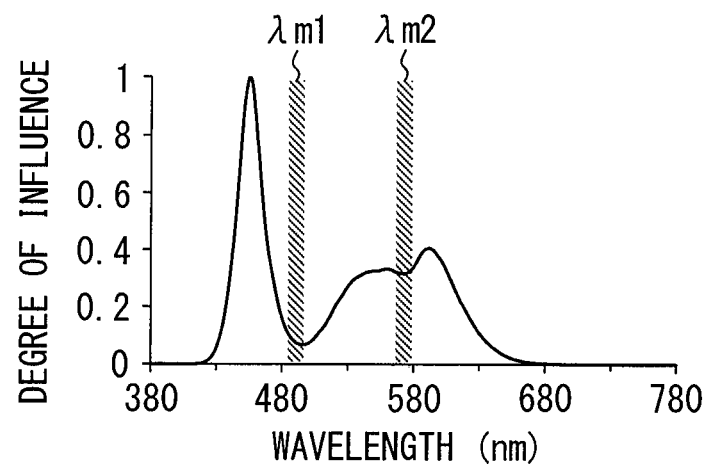
FIG. 12 is a graph showing a wavelength dependence of the degree of influence on chromaticity of the display light according to the embodiment.

The degree of influence on the chromaticity of each wavelength in the display light according to the present embodiment can be expressed as shown in FIG. 12 by multiplying the color matching function X, the color matching function Y, and the color matching function Z of FIG. 10 by the spectrum of the display light of FIG. 8. FIG. 12 indicates that the first wavelength region WR1 has a region in which the degree of influence is equal to or less than 0.2 while the second wavelength region WR2 has the degree of influence which is equal to or more than 0.3 over the entire region. Therefore, the first wavelength region WR1 is smaller in the degree of influence on the chromaticity than the second wavelength region WR2. The degree of influence of the first intermediate wavelength $\lambda m1$ is about 0.1, and the degree of influence of the second intermediate wavelength $\lambda m2$ is about 0.3. Therefore, the first intermediate wavelength $\lambda m1$ is smaller in the degree of influence on the chromaticity than the second intermediate wavelength $\lambda m2$.

When the transmittance in the wavelength region having a large degree of influence is set to be small with priority given to shielding the sunlight by the multilayer film filter unit 40, light in the wavelength region in the display light is also shielded by the multilayer film filter unit 40. When the light of the wavelength region having the large degree of influence in the display light is shielded, the influence on the display quality of the virtual image VI is large. Specifically, when the light having the wavelength region large in the degree of influence of luminance in the display light is shielded, the luminance of the virtual image VI is largely reduced, and when the light having the wavelength region larger in the degree of influence of chromaticity in the display light is shielded, the chromaticity of the virtual image VI greatly changes.

On the other hand, even if the transmittance in the wavelength region having a small degree of influence is set to be small, the influence on the display quality of the virtual image VI is small. In such a wavelength region, there is little concern even if priority is given to shielding sunlight. Therefore, it would be preferable to set the transmittance in the first wavelength region WR1 to be smaller than the transmittance in the second wavelength region WR2 with respect to the transmittance of the multilayer film filter unit 40. Similarly, it is preferable to set the reflectance of the first intermediate wavelength $\lambda m1$ to be smaller than the reflectance of the second intermediate wavelength $\lambda m2$.

The multilayer film filter unit 40 according to the present embodiment is configured to be able to shield at least a part of the external light incident from the projection window 2a while consideration is made about the degree of influence on the luminance and the degree of influence on the chromaticity. More specifically, the multilayer film filter unit 40 according to the present embodiment has a single inclined filter 42.

As shown in FIG. 2, the inclined filter 42 includes a light transmissive substrate 43 and an optical multilayer film 44. The light transmissive substrate 43 is made of, for example, synthetic resin, glass or the like and is formed in a plate-like shape having a light transmissive property. The light transmissive substrate 43 is substantially colorless and transparent, and has a large transmittance over the entire visible region.

The optical multilayer film 44 is formed on, for example, a surface 42a on the display light projection unit 10 side of surfaces 42a and 42b of the inclined filter 42. The optical multilayer film 44 is formed by lamination of thin films made of two or more types of optical materials each having a different refractive index along a normal direction ND to the surface 42a. As the thin film, a dielectric thin film or a metal thin film can be adopted. As the optical material of the thin film, for example, titanium oxide ($TiO_2$), silicon oxide ($SiO_2$), niobium oxide ($Nb_2O_5$), tantalum oxide ($Ta_2O_5$), magnesium fluoride ($MgF_2$), calcium fluoride ($CaF_2$), or the like can be used. The optical multilayer film 44 according to the present embodiment is formed by alternately stacking thin films made of titanium oxide and thin films made of silicon oxide.

The film thickness in each thin film is appropriately set, for example, under conditions based on the above consideration by optimization calculation by the computer in advance. In particular, since the inclined filter 42 according to the present embodiment is inclined as described in detail below, the optimization calculation is performed under the condition that the incident angle of the display light is set based on the inclination placement.

Figure 13:
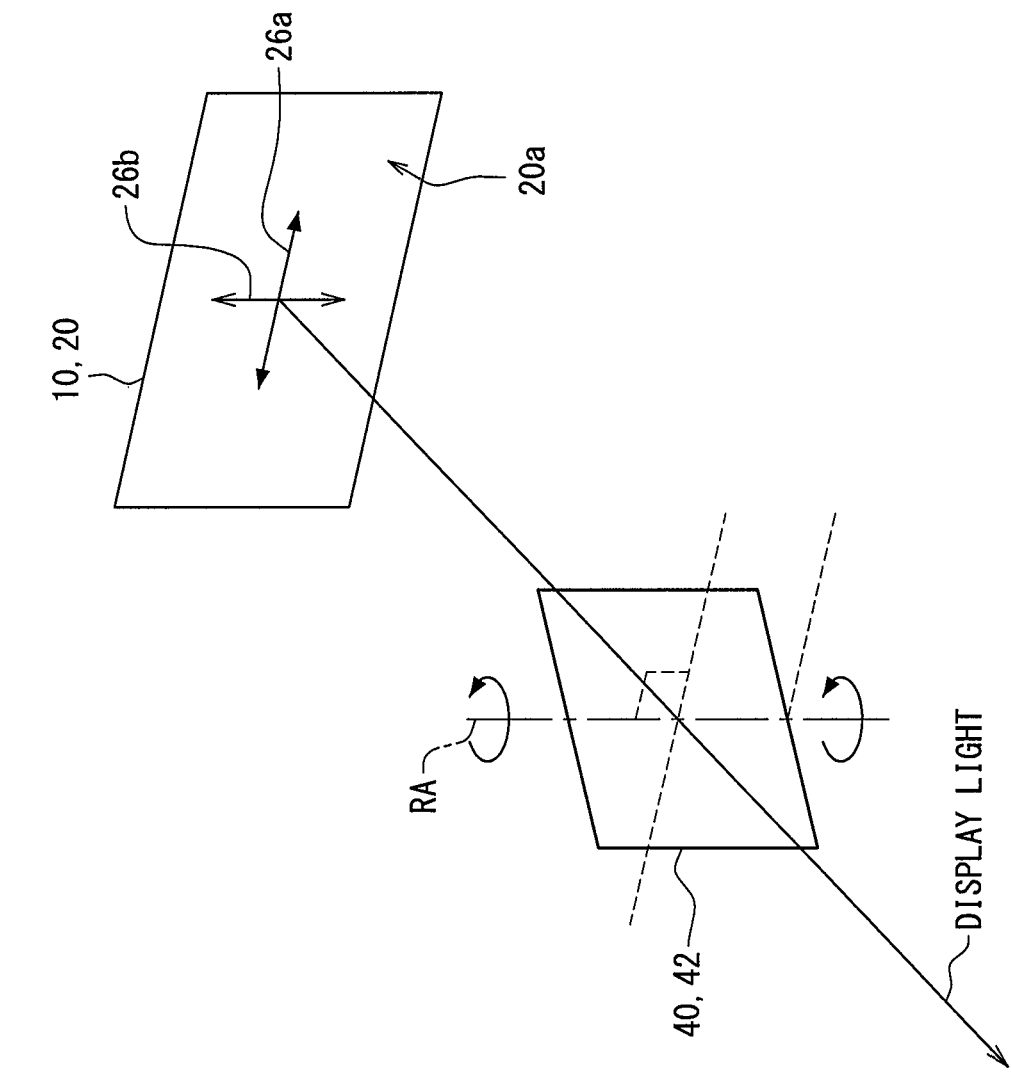
FIG. 13 is a diagram illustrating an inclined filter according to the embodiment.

As shown in FIG. 13, the inclined filter 42 is inclined with respect to the optical axis OA of the light guide unit 30. The inclination direction of the inclined filter 42 is set according to the placement of the polarizing plate 25a on the light guide unit 30 side of the liquid crystal panel 20. Specifically, the inclined filter 42 is inclined in a posture in which an axis obtained by projecting the absorption axis 26b of the polarizing plate 25a on the light guide unit 30 side onto the virtual plane along the optical axis OA is rotated as a virtual rotation axis RA from a state in which the inclined filter 42 is along the virtual plane perpendicular to the optical axis OA.

Since the display light projection unit 10 emits the display light as a linearly polarized light having the transmission axis 26a as the polarization direction, the display light enters the inclined filter 42 in a state where a component of a p-polarized light is larger than a component of an s-polarized light. More strictly speaking, the display light enters the inclined filter 42 as the p-polarized light.

Further, the inclined filter 42 is inclined so as to establish a Brewster's angle relationship with respect to the optical axis OA. That is, a part of the display light which travels along the optical axis OA enters the surface 42a of the inclined filter 42 at approximately a Brewster's angle as an incident angle. In other words, the inclined filter 42 is inclined in a posture rotated by an angle of a Brewster's angle about the above-mentioned rotation axis RA from a state along a virtual plane perpendicular to the optical axis OA. In the present embodiment, the normal direction ND of the surface 42a of the inclined filter 42 is inclined at an angle (for example, 58 degrees) of 30 degrees or more relative to the optical axis OA.

Figure 14:
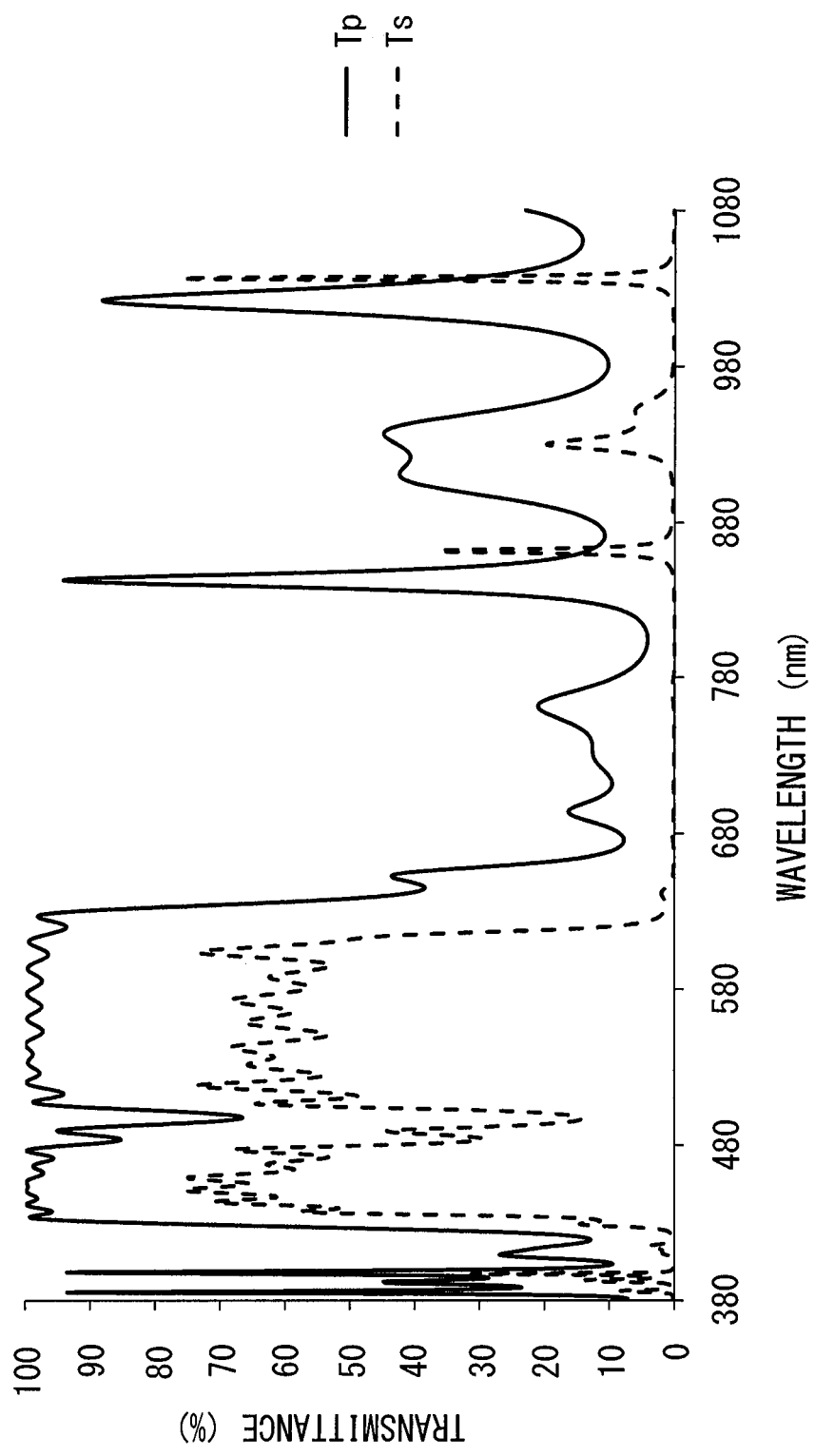
FIG. 14 is a graph showing a transmittance characteristic of a multilayer film filter unit according to the embodiment.

FIG. 14 shows a transmittance characteristic of the inclined filter 42 in the multilayer film filter unit 40. FIG. 14 shows a transmittance Tp corresponding to the p-polarized light component and a transmittance Ts corresponding to the s-polarized light component, which are the transmittance with the Brewster's angle corresponding to an actual display light as the incident angle. In this example, since the display light is incident on the inclined filter 42 as the p-polarized light, the transmittance Tp of the p-polarized light in FIG. 14 is substantially the transmittance of the multilayer film filter unit 40 with respect to the display light.

On the other hand, since the sunlight as the external light reaches the multilayer film filter unit 40 while being reflected on the mirrors 32 and 33, the sunlight basically enters the inclined filter 42 from a side opposite to the display light along the optical axis OA. Therefore, the sunlight also enters the surface 42b of the inclined filter 42 at approximately the Brewster's angle as the incident angle. Therefore, although the transmittance of the multilayer film filter unit 40 for the sunlight can also be referred to the transmittance in FIG. 14, it should be noted that the sunlight is basically randomly polarized light. In other words, a mean value of the transmittance Tp of the p-polarized light and the transmittance Ts of the s-polarized light in FIG. 14 is substantially the transmittance of the multilayer film filter unit 40 with respect to the sunlight. The transmittance shown in FIG. 14 is an energy transmittance.

With the inclined configuration described above, the external light such as the sunlight which is reflected on the inclined filter 42 without passing through the inclined filter 42 is reflected toward an inner wall of the housing 50.

The transmittance characteristic of the multilayer film filter unit 40 is characterized by the result of light interference in the optical multilayer film 44. For that reason, the transmittances Tp and Ts of the multilayer film filter unit 40 hardly take discrete values with respect to the wavelength, except for, for example, when the number of films of the thin film exceeds the common-sense number of films, when the absorption line specific to the optical material of the thin film is remarkably affected, and the like. In other words, even if the transmittances Tp and Ts between the following two specific wavelengths are compared with each other below, there is a high probability that the above comparison is also practically applied to a wavelength close to the specific wavelength.

In this example, the transmittance of the multilayer film filter unit 40 with respect to the display light, which takes a minimum value among the transmittances of respective wavelengths in a target wavelength region, is defined as a minimum transmittance. With the above definition, referring to FIG. 14, it can be found that the minimum transmittance in the first wavelength region WR1 is smaller than the minimum transmittance in the second wavelength region WR2.

Similarly, referring to FIG. 14, it can be found that the transmittance at the first intermediate wavelength $\lambda m1$ is smaller than the transmittance at the second intermediate wavelength $\lambda m2$.

More specifically, as the transmittance for the display light, the minimum reflectance in the second wavelength region WR2 and the transmittance Tp of the p-polarized light at the second intermediate wavelength $\lambda m2$ are 80% or more, while the minimum reflectance in the first wavelength region WR1 and the transmittance Tp of the p-polarized light at the first intermediate wavelength $\lambda m1$ are 80% or less.

In the visible region, it is found that the transmittance characteristic of the multilayer film filter unit 40 is approximately negatively correlated with the color matching function X, the color matching function Y, and the color matching function Z shown in FIG. 10, the wavelength dependence of the degree of influence on the luminance shown in FIG. 8, and/or the wavelength dependence of the degree of influence on the chromaticity shown in FIG. 9.

Referring also to FIG. 14, it can be found that, in the transmittance for the display light or the sunlight, a mean transmittance in the infrared region is smaller than a mean transmittance in the visible region. The mean transmittance in the infrared region for the display light or the sunlight is 20% or less.

More specifically, the mean transmittance of the p-polarized light is 91% and the mean transmittance of the s-polarized light is 48% in the wavelength region in a range of from 420 to 640 nm in the visible region. A difference between the mean transmittance of the p-polarized light and the mean transmittance of the s-polarized light is about 40%. When the p-polarized light and the s-polarized light are further averaged as the transmittance for the sunlight, the transmittance is about 70%. When the p-polarized light and the s-polarized light in the infrared region are averaged, the transmittance is about 14%.

Operational Effects

The operational effects according to the present embodiment described above will be described below.

According to the present embodiment, the minimum transmittance of the multilayer film filter unit 40 in the first wavelength region WR1 is smaller than that of the second wavelength region WR2. With the above configuration, since the minimum transmittance is large in the second wavelength region WR2 having a relatively large degree of influence on the virtual image VI, the display light easily passes through the multilayer film filter unit 40. Therefore, a large amount of the display light in the second wavelength region WR2 is enabled to contribute to the display of the virtual image VI by projection of the display light onto the windshield 3. On the other hand, in the first wavelength region WR1, since the minimum transmittance is small, it is difficult for the display light to pass through the multilayer film filter unit 40 and be guided toward the windshield 3. However, the degree of influence on the virtual image VI is relatively small. Even if the light in the first wavelength region WR1 in the external light such as the sunlight enters the inside of the HUD device 100 through the projection window 2a, the light hardly passes through the multilayer film filter unit 40, so that the light reaching the display light projection unit 10 and the display light projection unit 10 is restricted from subjecting damage by heat. As described above, as a result of adopting the multilayer film filter unit 40 having the transmittance characteristic in consideration of the color matching functions X, Y, and Z in the XYZ color system, the HUD device 100 can be provided which further enhances the resistance to the external light while maintaining the display quality of the virtual image VI.

According to the present embodiment, the transmittance of the multilayer film filter unit 40 at the first intermediate wavelength $\lambda m1$ is smaller than at the second intermediate wavelength $\lambda m2$. With the above configuration, since the transmittance is large in the vicinity of the second intermediate wavelength $\lambda m2$ having a relatively large degree of influence on the virtual image VI, the display light is likely to pass through the multilayer film filter unit 40. Therefore, with projection of the display light onto the windshield 3, a large amount of the display light having a wavelength in the vicinity of the second intermediate wavelength $\lambda m 2$ is enabled to contribute to the display of the virtual image VI. On the other hand, since the transmittance is small in the vicinity of the first intermediate wavelength $\lambda m1$, it becomes difficult for the display light to pass through the multilayer film filter unit 40 and be guided to the windshield 3. However, Its degree of influence on the virtual image VI is relatively small. Even if the light having a wavelength in the vicinity of the first intermediate wavelength $\lambda m1$ in the external light such as the sunlight enters the inside of the HUD device 100 through the projection window 2a, the light hardly passes through the multilayer film filter unit 40, so that the light reaches the display light projection unit 10 and the display light projection unit 10 is restricted from subjecting damage by heat. As described above, as a result of adopting the multilayer film filter unit 40 having the transmittance characteristic in consideration of the color matching functions X, Y, and Z in the XYZ color system, the HUD device 100 can be provided which further enhances the resistance to the external light while maintaining the display quality of the virtual image VI.

According to the present embodiment, the mean transmittance of respective wavelengths in the infrared region is smaller than the mean transmittance of respective wavelengths in the visible region. In the transmittance characteristic of the multilayer film filter unit 40 described above, even if the light in the infrared region in the external light such as the sunlight enters the inside of the HUD device 100 through the projection window 2a, the light hardly passes through the multilayer film filter unit 40 so that the light is restricted from reaching the display light projection unit 10. On the other hand, a relatively large amount of display light including the wavelengths in the visible region can be guided toward the windshield 3. Therefore, a large amount of display light is enabled to contribute to the display of the virtual image VI.

In addition, according to the present embodiment, the mean transmittance of respective wavelengths in the wavelength region which is equal to or more than 780 nm and equal to or less than 1080 nm as the infrared region is equal to or less than 20%. This configuration enables to reliably shield the external light in the infrared region by using the multilayer film filter unit 40, and enables to cause the light in the infrared region in the external light to hardly reach the display light projection unit 10.

Further, according to the present embodiment, the inclined filter 42 is inclined with respect to the optical axis OA. With the inclined placement described above, the display light enters the inclined filter 42 in a state in which the component of the p-polarized light is larger than the component of the s-polarized light. According to the Fresnel equation, since the transmittance Tp of the p-polarized light tends to be larger than the transmittance Ts of the s-polarized light, the inclined filter 42 can efficiently transmit the display light with the use of a difference between the transmittances Tp and Ts of the respective polarization components. On the other hand, since the external light such as the sunlight enters the inclined filter 42 in a state of substantially random polarization, the external light is shielded due to the mean transmittance of each polarized light. In other words, a ratio of the light to be shielded may be increased by the influence of the decrease in the transmittance Ts of the s-polarized light. As a result, the display quality of the virtual image VI can be enhanced, and the resistance to the external light can be further enhanced.

Further, according to the present embodiment, the display light projected by the display light projection unit 10 and polarized into a linearly polarized light enters the inclined filter 42 as the p-polarized light. According to the Fresnel equation, since the transmittance Tp of the p-polarized light tends to be larger than the transmittance Ts of the s-polarized light, the inclined filter 42 can efficiently transmit the display light by surely using a difference between the transmittances Tp and Ts of the respective polarization components.

Further, according to the present embodiment, the inclined filter 42 is inclined so as to establish a Brewster's angle relationship with respect to the optical axis OA. With the above configuration, a large amount of the display light is incident on the inclined filter 42 at an angle close to the Brewster's angle. According to the Fresnel equation, since the transmittance Tp of the p-polarized light is maximized at the Brewster's angle, the inclined filter 42 can maximize the efficiency and transmit the display light.

Further, according to the present embodiment, the inclined filter 42 is inclined so that the normal direction ND to the surface 42a forms an angle of 30 degrees or more with respect to the optical axis OA. In the above configuration, since the transmittance Tp of the p-polarized light can be steadily made large with respect to the s-polarized light, the inclined filter 42 can efficiently transmit the display light by surely using the difference between the transmittances Tp and Ts of the respective polarized light components.

Other Embodiments

Although one embodiment of the present disclosure has been described above, the present disclosure is not construed as being limited to the embodiment, and can be applied to various embodiments within a scope not departing from the spirit of the present disclosure.

Specifically, in a first modification, the optical multilayer film 44 may be formed on the surface 42b of the inclined filter 42 having the surfaces 42a and 42b on an opposite side of the display light projection unit 10.

In a second modification, the optical multilayer film 44 may be formed on both of the surface 42a on the display light projection unit 10 side and the surface 42b on the opposite side to the display light projection unit 10, in the surfaces 42a and 42b of the inclined filter 42.

In a third modification, the inclined filter 42 may not have a Brewster's angle relationship with respect to the optical axis OA, and may be inclined so that the normal direction ND forms an angle of 30 degrees or more with respect to the optical axis OA.

Figure 15:
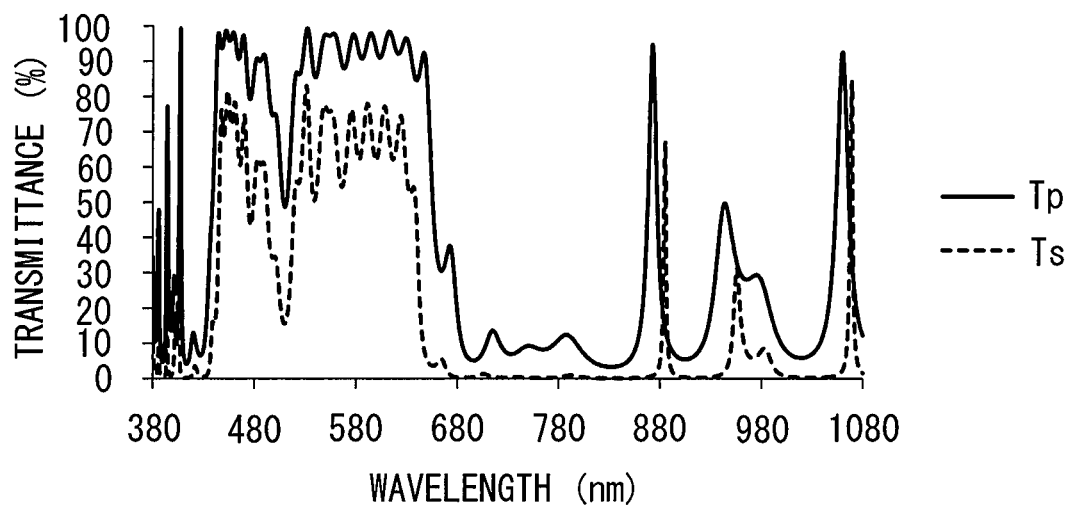
FIG. 15 is a graph corresponding to FIG. 14 in an example of a third modification.
Figure 16:
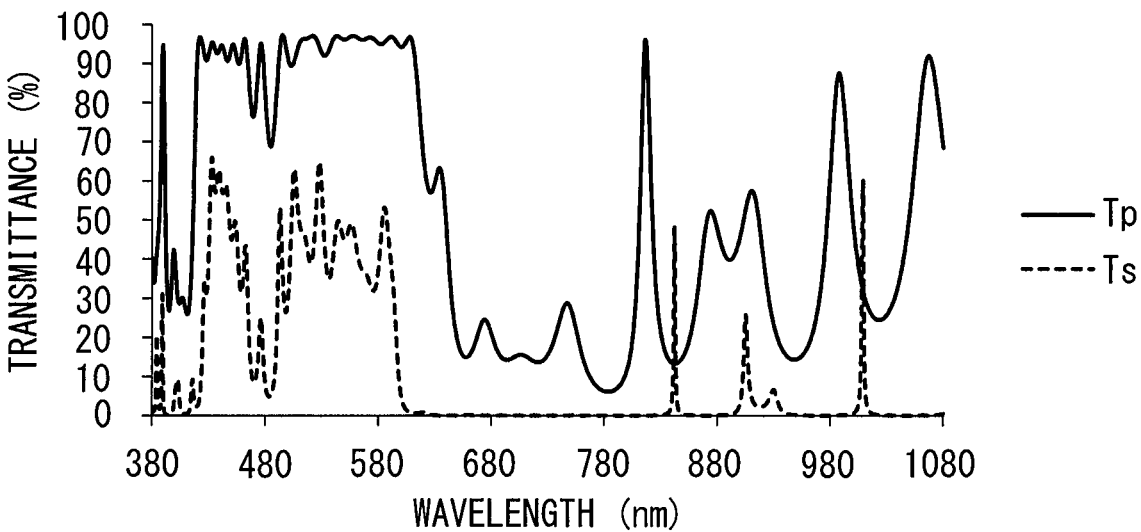
FIG. 16 is a graph corresponding to FIG. 14 in another example of the third modification.
Figure 17:
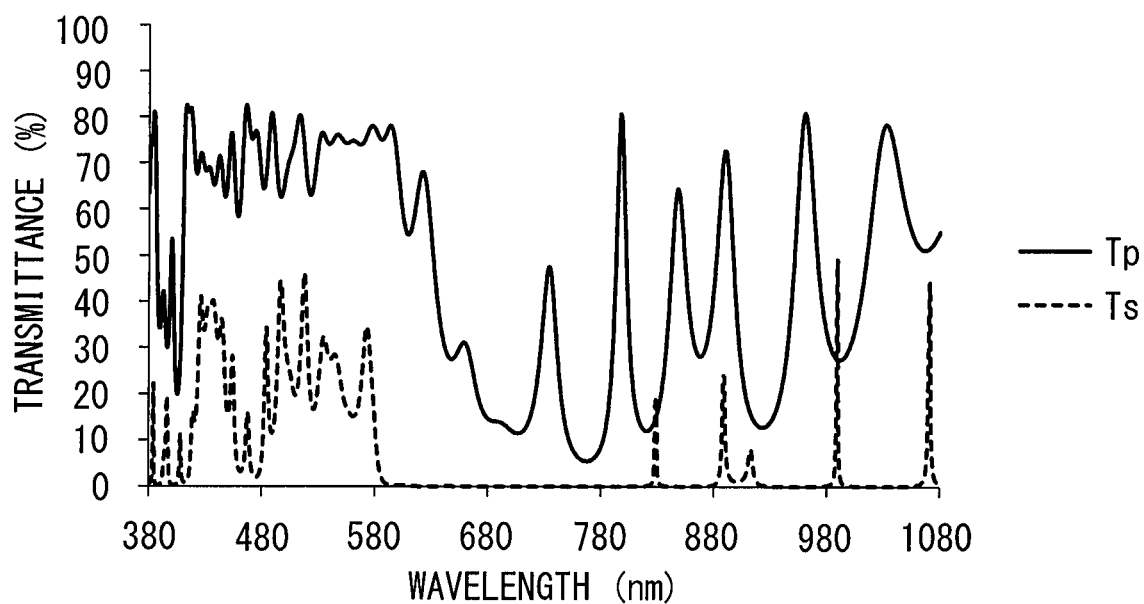
FIG. 17 is a graph corresponding to FIG. 14 in still another example of the third modification.

Graphs of the transmittance characteristic when the angle of the normal direction ND with respect to the optical axis OA is changed are shown in FIGS. 15 to 17. In the case of FIG. 15 in which the angle of the normal direction ND with respect to the optical axis OA is smaller than the Brewster's angle, the transmittance Ts of the s-polarized light is smaller about 20% than the transmittance Tp of the p-polarized light, but a difference between the transmittance Ts and the transmittance Tp is smaller than that in the case in which the Brewster's angle relationship is established. For that reason, the effect of shielding the external light is smaller than that in the case where the Brewster's angle relationship is established. FIG. 15 shows a case in which the angle of the normal direction ND with respect to the optical axis OA is 48 degrees.

In the case of FIGS. 16 and 17 in which the angle of the normal direction ND with respect to the optical axis OA is larger than the Brewster's angle, although the effect of shielding the external light is enhanced by the small transmittance Ts of the s-polarized light, the transmittance of the p-polarized light is also reduced, so that the luminance of the virtual image VI is lowered. FIG. 16 shows a case in which the angle of the normal direction ND with respect to the optical axis OA is 68 degrees, and FIG. 17 shows a case in which the angle of the normal direction ND with respect to the optical axis OA is 78 degrees.

Figure 18:
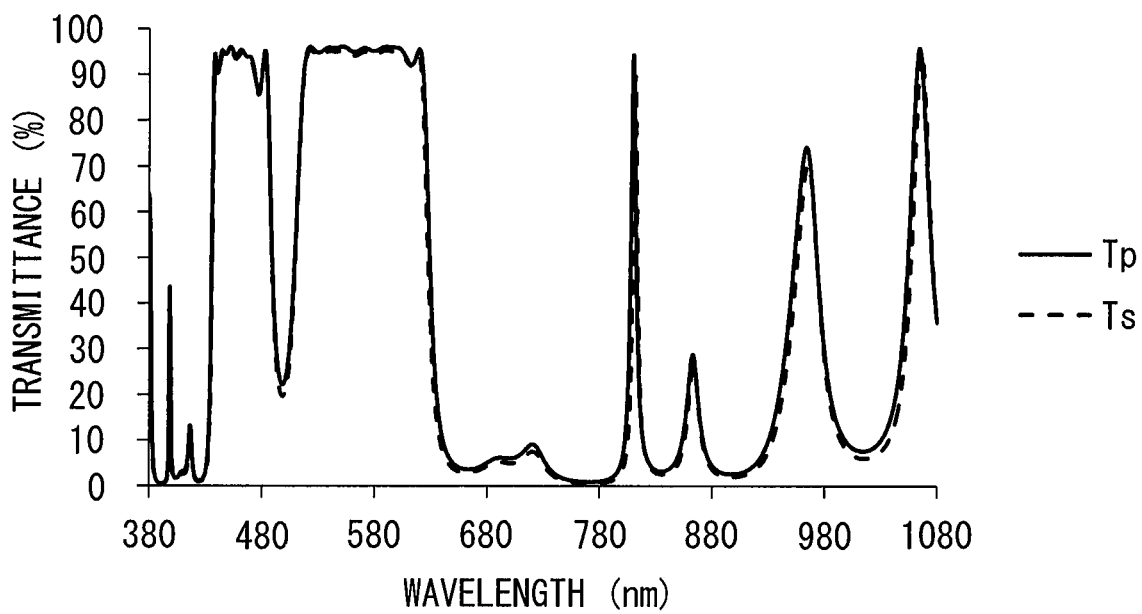
FIG. 18 is a graph corresponding to FIG. 14 in another example of a fourth modification.

In a fourth modification, as shown in FIG. 18, the inclined filter 42 may be inclined so that the normal direction ND forms an angle which is more than 0 degrees and less than 30 degrees with respect to the optical axis OA. FIG. 18 shows a case in which the angle of the normal direction ND with respect to the optical axis OA is 15 degrees.

In a fifth modification, the multilayer film filter unit 40 may be configured with a filter that is not inclined with respect to the optical axis OA.

In a sixth modification, the multilayer film filter unit 40 may not be located closer to the display light projection unit 10 than the mirrors 32 and 33 of the light guide unit 30. As an example, the multilayer film filter unit 40 may be located between the planar mirror 32 and the concave mirror 33. The multilayer film filter unit 40 may be provided on the windshield 3 side with respect to the mirrors 32 and 33, for example, as the dustproof cover 52 for closing the projection window 2a.

In a seventh modification, the multilayer film filter unit 40 may be configured with multiple filters.

In an eighth modification, the display light projection unit 10 can employ another configuration. For example, in addition to the red, green, and blue color filters, a color filter such as a yellow color filter may be added as the color filter of the liquid crystal panel 20. In this case, since the degree of influence of the wavelength in the vicinity of 580 nm in the display light is relatively increased by the yellow color filter, the application effect of the multilayer film filter unit 40 is synergistically increased. Further, for example, the liquid crystal panel 20 may not be provided with a color filter, and the display light projection unit 10 may project a white light.

Furthermore, the display light projection unit 10 not using the liquid crystal panel 20 may be employed. As an example, a laser scanner system may be employed in which an image is formed on a screen by scanning a direction of a scanning mirror on which a laser light beam is incident and projected as the display light. The display light projected from the display light projection unit 10 may be unpolarized. Even the display light that is not polarized by the display light projection unit 10 can be made incident on the multilayer film filter unit 40 in a state in which the component of the p-polarized light is larger than the component of the s-polarized light by changing the polarization state before entering the multilayer film filter unit 40.

In a ninth modification, the present disclosure may be applied to various mobile objects (transportation equipment) such as vessels or aircraft other than the vehicle 1.

The head-up display device described above is mounted on the movable object 1 and projects the display light onto the projection member 3 through the projection window 2a, to thereby virtually display the image visibly recognized by the occupant. The head-up display device includes the display light projection unit 10 and the light guide unit 30. The display light projection unit 10 projects the image as the display light which includes multiple wavelengths in the visible region. The light guide unit 30 guides the display light from the display light projection unit toward the projection member. The light guide unit includes the multilayer film filter unit 40 which transmits the display light using the optical multilayer film 44 and which can shield the external light incident from the projection window. In the XYZ color system, the first wavelength region WR1 is a wavelength region between the wavelength λzm having the maximum value of the color matching function Z and the wavelength λym having the maximum value of the color matching function Y, and the second wavelength region WR2 is a wavelength region between the wavelength having the maximum value of the color matching function Y and the wavelength λxm having the maximum value of the color matching function X. The minimum transmittance is the transmittance of the multilayer film filter unit with respect to the display light, and is the transmittance that takes the minimum value among the transmittances of respective wavelength in the target wavelength region. The minimum transmittance in the first wavelength region is smaller than the minimum transmittance in the second wavelength region.

According to the configuration described above, the minimum transmittance of the multilayer film filter unit in the first wavelength region is smaller than that in the second wavelength region. With the above configuration, since the minimum transmittance is large in the second wavelength region in which the degree of influence on the virtual image is relatively large, the display light easily passes through the multilayer film filter unit, and therefore, with the projection of the display light onto the projection member, a large amount of the display light in the second wavelength region is enabled to contribute to the display of the virtual image. On the other hand, in the first wavelength region, since the minimum transmittance is small, it is difficult for the display light to pass through the multilayer film filter unit and be guided toward the projection member, but the degree of influence on the virtual image is relatively small. Even if the light in the first wavelength region in the external light such as the sunlight enters the inside of the HUD device through the projection window, the light hardly passes through the multilayer film filter unit, so that the light reaches the display light projection unit and the display light projection unit is restricted from subjecting damage by heat. As described above, as a result of adopting the multilayer film filter unit having the transmittance characteristic in consideration of the color matching functions X, Y, and Z in the XYZ color system, the HUD device can be provided which further enhances the resistance to the external light while maintaining the display quality of the virtual image.

In addition, the head-up display device described above is mounted on the movable object and projects the display light onto the projection member 3 through the projection window 2a, to thereby virtually display the image visibly recognized by the occupant. The head-up display device includes the display light projection unit 10 and the light guide unit 30. The display light projection unit 10 projects the image as the display light which includes multiple wavelengths in the visible region. The light guide unit 30 guides the display light from the display light projection unit toward the projection member.

The light guide unit includes the multilayer film filter unit 40 which transmits the display light using the optical multilayer film 44 and which can shield the external light incident from the projection window. In the XYZ color system, the first intermediate wavelength $\lambda m1$ is a wavelength which is just intermediate between the wavelength $\lambda zm$ at which the value of the color matching function Z is maximized and the wavelength $\lambda ym$ at which the value of the color matching function Y is maximized, and the second intermediate wavelength $\lambda m2$ is a wavelength which is just intermediate between the wavelength at which the value of the color matching function Y is maximized and the wavelength $\lambda zm$ at which the value of the color matching function X is maximized. In the transmittance of the multilayer film filter unit with respect to the display light, the transmittance at the first intermediate wavelength is smaller than the transmittance at the second intermediate wavelength.

According to the above disclosure, the transmittance of the multilayer film filter unit at the first intermediate wavelength is smaller than that at the second intermediate wavelength. With the above configuration, in the vicinity of the second intermediate wavelength having a relatively large degree of influence on the virtual image, since the transmittance is large, the display light easily passes through the multilayer film filter unit, and therefore, with the projection of the display light onto the projection member, a large amount of the display light having a wavelength in the vicinity of the second intermediate wavelength is enabled to contribute to the display of the virtual image. On the other hand, in the vicinity of the first intermediate wavelength, since the transmittance is small, it is difficult for the display light to pass through the multilayer film filter unit and be guided to the projection member, but the degree of influence on the virtual image is relatively small. Even if the light having a wavelength in the vicinity of the first intermediate wavelength in the external light such as the sunlight enters the inside of the HUD device through the projection window, the light hardly passes through the multilayer film filter unit, so that the light reaches the display light projection unit and the display light projection unit is restricted from subjecting damage by heat. As described above, as a result of adopting the multilayer film filter unit having the transmittance characteristic in consideration of the color matching functions X, Y, and Z in the XYZ color system, the HUD device can be provided which further enhances the resistance to the external light while maintaining the display quality of the virtual image.

The present disclosure has been described based on examples, but it is understood that the present disclosure is not limited to the examples or structures. The present disclosure includes various modification examples and modifications within the equivalent range. In addition, it should be understood that various combinations or aspects, or other combinations or aspects, in which only one element, one or more elements, or one or less elements is included to the various combinations or aspects, are included in the scope or the technical idea of the present disclosure.

The invention claimed is:

1. A head-up display device configured to be mounted on a movable object and to project a display light through a projection window onto a projection member to display a virtual image visibly recognizable by an occupant, the head-up display device comprising:
   a display light projection unit configured to project an image as the display light including a plurality of wavelengths in a visible region; and
   a light guide unit configured to guide the display light from the display light projection unit toward the projection member, wherein
   the light guide unit includes a multilayer film filter unit configured to transmit the display light and to shield an external light incident from the projection window by using an optical multilayer film,
   in the XYZ color system, a wavelength region between a wavelength at which a value of a color matching function Z is maximum and a wavelength at which a value of a color matching function Y is maximum is defined as a first wavelength region, and a wavelength region between the wavelength at which the value of the color matching function Y is maximum and a wavelength at which a value of a color matching function X is maximum is defined as a second wavelength region,
   a transmittance of the multilayer film filter unit with respect to the display light, which takes a minimum value among transmittances of respective wavelengths in a target wavelength region, is defined as a minimum transmittance, and
   the minimum transmittance in the first wavelength region is smaller than the minimum transmittance in the second wavelength region.

2. The head-up display device according to claim 1, wherein
   among the transmittances of the multilayer film filter unit with respect to the display light, a mean transmittance of respective wavelengths in an infrared region is smaller than a mean transmittance of respective wavelengths in a visible region.

3. The head-up display device according to claim 1, wherein
   among the transmittances of the multilayer film filter unit with respect to the external light, a mean transmittance of respective wavelengths in a wavelength region as the infrared region, which is more than or equal to 780 nm and is less than or equal to 1080 nm, is equal to or less than 20%.

4. The head-up display device according to claim 1, wherein
the multilayer film filter unit includes an inclined filter including a light transmissive substrate and the optical multilayer film stacked on its surface, and
the inclined filter is inclined with respect to an optical axis of the light guide unit to allow the display light to be incident in a state in which a component of a p-polarized light is larger than a component of an s-polarized light.

5. The head-up display device according to claim 4, wherein
the display light projection unit is configured to project the display light polarized into a linearly polarized light, and
the inclined filter is inclined with respect to the optical axis to allow the display light to be incident as the p-polarized light.

6. The head-up display device according to claim 4, wherein
the inclined filter is inclined to establish a Brewster's angle relationship with respect to the optical axis.

7. The head-up display device according to claim 4, wherein
the inclined filter is inclined to allow a normal direction ND to the surface forms an angle of 30 degrees or more with respect to the optical axis.

8. A head-up display device configured to be mounted on a movable object and to project a display light through a projection window onto a projection member to display a virtual image visibly recognizable by an occupant, the head-up display device comprising:
a display light projection unit configured to project an image as the display light including a plurality of wavelengths in a visible region; and
a light guide unit configured to guide the display light from the display light projection unit toward the projection member, wherein
the light guide unit includes a multilayer film filter unit configured to transmit the display light and to shield an external light incident from the projection window by using an optical multilayer film,
in the XYZ color system, a wavelength which is intermediate between a wavelength at which a value of a color matching function Z is maximum and a wavelength at which a value of a color matching function Y is maximum is defined as a first intermediate wavelength, and a wavelength which is intermediate between the wavelength at which the value of the color matching function Y is maximum and a wavelength at which a value of a color matching function X is maximum is defined as a second intermediate wavelength, and
among transmittances of the multilayer film filter unit with respect to the display light, a transmittance of the first intermediate wavelength is smaller than the transmittance of the second intermediate wavelength.

9. The head-up display device according to claim 8, wherein
among the transmittances of the multilayer film filter unit with respect to the display light, a mean transmittance of respective wavelengths in an infrared region is smaller than a mean transmittance of respective wavelengths in a visible region.

10. The head-up display device according to claim 8, wherein
among the transmittances of the multilayer film filter unit with respect to the external light, a mean transmittance of respective wavelengths in a wavelength region as the infrared region, which is more than or equal to 780 nm and is less than or equal to 1080 nm, is equal to or less than 20%.

11. The head-up display device according to claim 2, wherein
the multilayer film filter unit includes an inclined filter including a light transmissive substrate and the optical multilayer film stacked on its surface, and
the inclined filter is inclined with respect to an optical axis of the light guide unit to allow the display light to be incident in a state in which a component of a p-polarized light is larger than a component of an s-polarized light.

12. The head-up display device according to claim 11, wherein
the display light projection unit is configured to project the display light polarized into a linearly polarized light, and
the inclined filter is inclined with respect to the optical axis to allow the display light to be incident as the p-polarized light.

13. The head-up display device according to claim 11, wherein
the inclined filter is inclined to establish a Brewster's angle relationship with respect to the optical axis.

14. The head-up display device according to claim 11, wherein
the inclined filter is inclined to allow a normal direction ND to the surface forms an angle of 30 degrees or more with respect to the optical axis.

* * * * *